United States Patent
Choi et al.

(10) Patent No.: US 12,235,147 B2
(45) Date of Patent: Feb. 25, 2025

(54) APPARATUS AND METHOD FOR SENSING WATER LEVEL

(71) Applicant: NANOKEM CO., LTD., Gyeongsangbuk-do (KR)

(72) Inventors: Young-Hwan Choi, Seoul (KR); Sung-An Ha, Gyeongsangbuk-do (KR)

(73) Assignee: NANOKEM CO., LTD., Gyeongsangbuk-do (KR)

( * ) Notice: Subject to any disclaimer, the term of this patent is extended or adjusted under 35 U.S.C. 154(b) by 298 days.

(21) Appl. No.: 17/796,081

(22) PCT Filed: Jan. 26, 2021

(86) PCT No.: PCT/KR2021/001020
§ 371 (c)(1),
(2) Date: Jul. 28, 2022

(87) PCT Pub. No.: WO2021/153970
PCT Pub. Date: Aug. 5, 2021

(65) Prior Publication Data
US 2023/0113463 A1    Apr. 13, 2023

(30) Foreign Application Priority Data
Jan. 30, 2020 (KR) .................. 10-2020-0010791

(51) Int. Cl.
*G01F 23/24* (2006.01)
(52) U.S. Cl.
CPC .......... *G01F 23/244* (2013.01); *G01F 23/241* (2013.01)

(58) Field of Classification Search
CPC .......... G01F 23/244; G01F 23/24–248; G01F 23/26–288
See application file for complete search history.

(56) References Cited

U.S. PATENT DOCUMENTS

| | | | | |
|---|---|---|---|---|
| 3,925,715 A | * | 12/1975 | Venable | H02M 3/3378 363/26 |
| 10,295,390 B2 | * | 5/2019 | Bian | G01F 23/265 |
| 11,340,096 B2 | * | 5/2022 | Spencer | G01F 23/266 |

FOREIGN PATENT DOCUMENTS

| | | | | |
|---|---|---|---|---|
| CN | 207968315 U | * | 10/2018 | |
| DE | 102004008125 A1 | * | 9/2005 | G01F 23/266 |
| JP | H05288592 A | * | 11/1993 | |
| JP | 106307915 A | | 11/1994 | |
| JP | 2000039479 A | | 2/2000 | |
| JP | 2004069630 A | | 3/2004 | |
| KR | 20-1995-0025597 U | | 9/1995 | |
| KR | 20030091880 A | | 12/2003 | |

OTHER PUBLICATIONS

International Search Report dated May 6, 2021 issued in PCT/KR2021/001020, 5 pages.

* cited by examiner

*Primary Examiner* — Justin N Olamit
(74) *Attorney, Agent, or Firm* — Scully, Scott, Murphy & Presser, P.C.

(57) ABSTRACT

The present invention relates to an apparatus and a method for detecting a water level, which are capable of generating a water level detection signal which is alternating current output to a water level detection sensor by using two direct current control signals alternately output from a micom.

6 Claims, 1 Drawing Sheet

APPARATUS AND METHOD FOR SENSING WATER LEVEL

TECHNICAL FIELD

The present invention relates to an apparatus and a method for detecting a water level, and more particularly, to an apparatus and a method for detecting a water level, which are capable of generating a water level detection signal which is alternating current output to a water level detection sensor by using two direct current control signals alternately output from a micom.

BACKGROUND ART

In general, in water purification tanks, water and sewage tanks, oil tanks, and heating water of boilers, a means for adjusting a water level is required to maintain a certain water level or to reach a specific water level because the lack of water is generated according to natural evaporation or consumption.

When the boiler is described as an example, the boiler is installed in a house to provide hot water by heating water in a water tank by using energy such as gas, etc., and hot water warm a room temperature installed on the floor. In general, the boiler supplies the water in the water tank to a pipe installed on the floor of the room to warm the room. Accordingly, water of a predetermined amount or more should be continuously maintained in the tank of the boiler.

To this end, a water level detection apparatus for monitoring which amount of water in the boiler tank or whether the water falls to a lowest water level or less is installed in the boiler.

In general, the water level detection apparatus of the boiler outputs a water level monitoring signal which is an alternating current signal to a water level sensor (water level ball) for detecting the water level of the water tank and judges whether the water level of the boiler water tank is a predetermined water level or less according to the water level detection signal according to the water level being input.

A general water level monitoring signal output scheme adopts an AC-AC conversion scheme that supplies voltage of AC power 220 V/60 Hz to a primary side of a transformer, and rectifies the water level monitoring signal which is the AC power reduced in the transformer and output to a secondary side of the transformer and outputs the rectified water level monitoring signal to the water level sensor.

As described above, since the conventional boiler water level detection apparatus adopts the AC-AC scheme, a DC voltage component may be included in the water level monitoring signal which is the AC component, and electrolysis is generated by a minute DC voltage component included in the AC component, and as a result, there is a problem in which a phenomenon in which the water level sensor is electrically corroded.

Accordingly, the development of the water level detection apparatus is required, which prevents the DC component from being included in the water level monitoring signal which is the AC signal.

DISCLOSURE

Technical Problem

Accordingly, an object of the present invention is to provide an apparatus and a method for detecting a water level, which are capable of generating a water level detection signal which is alternating current output to a water level detection sensor by using two direct current control signals alternately output from a micom.

Technical Solution

In order to achieve the object, a water level detection apparatus according to the present invention includes: a micom outputting a first low water level control signal and a second low water level control signal which are square waves having a frequency, and have opposite phases, and receiving the water level detection signals for the first low water level control signal and the second low water level control signal, and performing a response operation; a control signal output unit receiving the first low water level control signal and the second low water level control signal, and outputs plus DC power and minus DC power having opposite phases for each of the first low water level control signal and the second low water level control signal; a conversion unit being applied with the plus DC power and the minus DC power, and outputting a water level monitoring signal which is AC power; a water level detection unit supplying the water level monitoring signal to a water level sensor, and outputting a water level detection signal when detecting a low water level of a predetermined reference or less; and a water level signal input unit receiving the water level detection signal and outputting the water level detection signal to the micom.

The control signal output unit includes a first switching unit in which an output terminal is connected to a primary plus terminal of the conversion unit, and which receives the first low water level monitoring signal to be turned on or off, a second switching unit in which the output terminal is connected to a primary minus terminal of the conversion unit, and which receives the second low water level monitoring signal to be turned on or off, and is turned on when the first switching unit is turned off, and a phase alternate DC voltage supply unit in which one side is connected to the output terminal of the first switching unit and the other side is connected to the output terminal of the second switching unit, and in order to alternately supply the plus DC power and the minus DC power to the primary side of the conversion unit, the DC voltage is connected between the one side and the other side, and then connected to a primary intermediate point of the transformer to alternately supply DC powers having different phases by turning on the first switching unit and the second switching unit to the intermediate point of the transformer.

The phase alternate DC voltage supply unit includes a first diode in which an anode is connected to the output terminal of the first switching unit and a cathode is connected to the intermediate point, a second diode in which the anode is connected to the output terminal of the second switching unit and the cathode is connected to the intermediate point, and a third resistor in which the DC power is applied to one terminal and the other terminal is connected to the cathodes of the first diode and the second diode.

The micom outputs the first low water level monitoring signal and the second low water level monitoring signal only for a predetermined time when a water level monitoring event occurs.

The micom adjusts frequencies of the first low water level monitoring signal and the second low water level monitoring signal in order to change the frequency of the water level monitoring signal.

In order to achieve the object, a water level detection method according to the present invention includes: a water level monitoring request process of outputting a first low water level control signal and a second low water level control signal micom which are square waves having a frequency, and have opposite phases; a control signal output process of receiving, by a control signal output unit, the first low water level control signal and the second low water level control signal, and outputs plus DC power and minus DC power having opposite phases for each of the first low water level control signal and the second low water level control signal to a conversion unit; a water level monitoring signal conversion process of being, by a conversion unit, applied with the plus DC power and the minus DC power, and outputting a water level monitoring signal which is AC power; a water level detection process of supplying, by a water level detection unit, the water level monitoring signal to a water level sensor, and outputting a water level detection signal when detecting a low water level of a predetermined reference or less; a water level signal input process of receiving, by a water level signal input unit, the water level detection signal and outputting the water level detection signal to the micom; and a low water level response operation process of receiving, by the micom, the water level monitoring signals for the first low water level control signal and the second low water level control signal, and performing a response operation.

The control signal output process includes a first switching step in which a first switching unit receives the first low water level monitoring signal to be turned on or off, a second switching step in which a second switching unit receives the second low water level monitoring signal to be turned on or off, and is turned on when the first switching unit is turned off, and a phase alternate DC voltage supply step in which in a phase alternate DC voltage supply unit, in order to alternately supply the plus DC power and the minus DC power to the primary side of the conversion unit, the DC voltage is connected between the one side and the other side, and then connected to a primary intermediate point of the transformer to alternately supply DC powers having different phases by turning on the first switching unit and the second switching unit to the intermediate point of the transformer.

The micom outputs the first low water level monitoring signal and the second low water level monitoring signal only for a predetermined time when a water level monitoring event occurs.

The micom adjusts frequencies of the first low water level monitoring signal and the second low water level monitoring signal in order to change the frequency of the water level monitoring signal.

Advantageous Effects

According to the present invention, DC current can be converted into AC current and flow only for a predetermined time with a water level sensor in a micom, and it is possible to arbitrarily adjust a frequency of the water level detection sensor supplied to the water level sensor, and as a result, there is an effect that the water level sensor, i.e., a water level ball can be prevented from being electrically corroded by an electrolyte, thereby securing durability of the water level ball.

MODE FOR INVENTION

Hereinafter, a configuration and an operation of a water level detection apparatus according to the present invention will be described with reference to the accompanying drawings, and a water level detection method in the apparatus will be described in detail.

Figure 1:
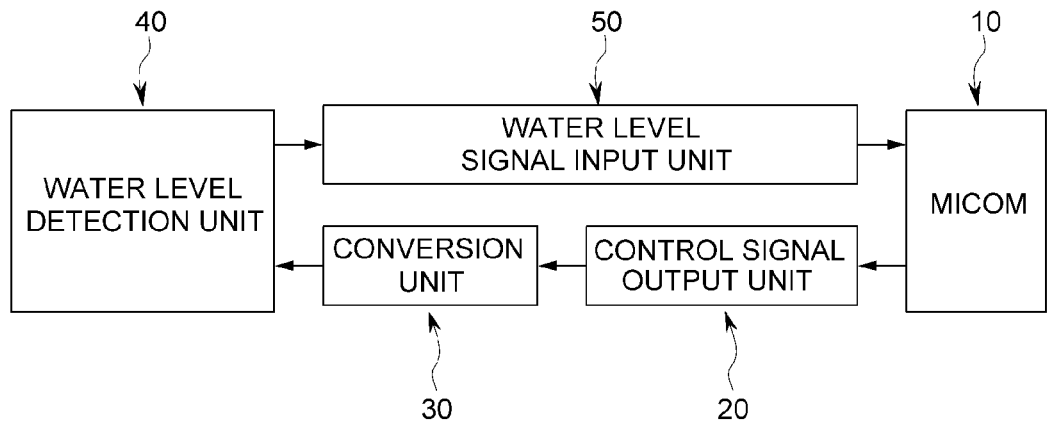
FIG. 1 is a diagram illustrating a configuration of a water level detection apparatus according to the present invention.
Figure 2:
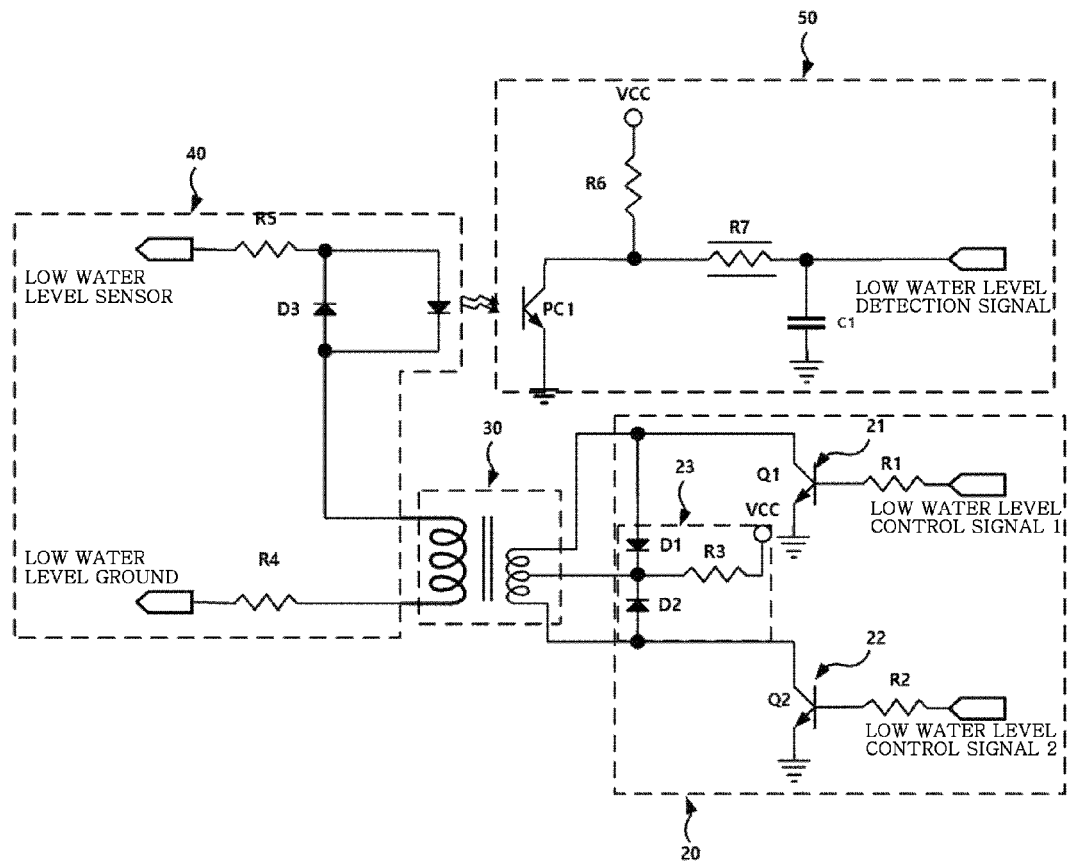
FIG. 2 illustrates a circuit diagram of the water level detection apparatus according to the present invention.

FIG. 1 is a diagram illustrating a configuration of a water level detection apparatus according to the present invention and FIG. 2 illustrates a circuit diagram of the water level detection apparatus according to the present invention.

Referring to FIGS. 1 and 2, the water level detection apparatus according to the present invention includes a micom 10, a control signal output unit 20, a conversion unit 30, a water level detection unit 40, and a water level signal input unit 50.

The micom 10 outputs a first low water level control signal and a second low water level control signal which are square waves having a frequency when a water level monitoring event occurs, and have opposite phases to the control signal output unit 20.

The micom 10 may also be configured to output the first low water level control signal and the second low water level control signal only for a predetermined time after the water level monitoring event occurs.

Further, the micom 10 adjusts the frequency of the water level monitoring signal output to the water level sensor (not illustrated), i.e., the water level ball in the water level detection unit 40 by adjusting the frequencies of the first low water level control signal and the second low water level control signal.

The micom 10 receives the water level monitoring signals for the first low water level control signal and the second low water level control signal from the water level signal input unit 50, and performs a response operation. The response operation will be able to be changed according to a type constituting the water level detection apparatus. In the case of the boiler, for example, the micom 10 may generate a low water level warning, or generate a warning after forcibly ending the operation if the boiler performs operations such as heating, hot water, etc.

The control signal output unit 20 receives the first low water level control signal and the second low water level control signal, and outputs plus DC power and minus DC power having opposite phases for each of the first low water level control signal and the second low water level control signal to the primary side of the conversion unit 30.

As illustrated in FIG. 2, the control signal output unit 20 includes a first switching unit 21, a second switching unit 22, and a phase alternate DC voltage supply unit 23.

The first switching unit 21 adopts a transistor in FIG. 2, but may adopt other elements such as a relay, a MOS transistor, etc.

In the first switching unit 21, an output terminal, i.e., a collector is connected to a primary plus terminal of the conversion unit 30, and the first switching unit 21 receives the first low water level monitoring signal to be turned on or ff.

In the second switching unit 22, the output terminal is connected to a primary minus terminal of the conversion unit 30, and the second switching unit 22 receives the second low water level monitoring signal to be turned on or off, and is turned on when the first switching unit 21 is turned off and turned off when the first switching unit 21 is turned on.

One side of the phase alternate DC voltage supply unit 23 is connected to the output terminal of the first switching unit 21 and the other side is connected to the output terminal of the second switching unit 22, and in order to alternately supply the plus DC power and the minus DC power to the primary side of the conversion unit 30, the DC voltage is connected between the one side and the other side, and then connected to a primary intermediate point of the transformer 30 to alternately supply DC powers having different phases by turning on the first switching unit 21 and the second switching unit 22 to the intermediate point of the transformer.

The phase alternate DC voltage supply unit 23 may be configured to include a first diode D1 in which an anode is connected to the output terminal of the first switching unit and a cathode is connected to the intermediate point, a second diode D2 in which the anode is connected to the output terminal of the second switching unit and the cathode is connected to the intermediate point, and a third resistor R3 in which the DC power is applied to one terminal and the other terminal is connected to the cathodes of the first diode and the second diode.

In the conversion unit 30 as a transformer including a primary side and a secondary side, when the output terminal of the first switching unit 21 is connected to the primary plus terminal (minus terminal) and the output terminal of the second switching unit 22 is connected to the primary minus terminal (plus terminal), the DC power (VCC) is connected to the primary intermediate point to generate the water level monitoring signal converted into the AC power for the DC voltage applied to the intermediate point and the plus terminal, and the intermediate point and the minus terminal and output the generated water level monitoring signal to the water level detection unit 40.

The water level detection unit 40 supplies the water level monitoring signal to the water level sensor (not illustrated), i.e., the water level ball, and outputs the water level detection signal to the water level signal input unit 50 when detecting a low water level of a predetermined reference or less.

It will be preferable that the water level detection unit 40 applies a photo coupler PC1 in order to transfer the water level detection signal to the water level signal input unit 50. To this end, a light emitting unit of the photo coupler PC1 should be configured in the water level detection unit 40 and a light receiving unit should be configured in the water level signal input unit 50.

The water level signal input unit 50 receives the water level detection signal and processes the water level detection signal as a signal which may be recognized by the micom 10 and outputs the signal to the micom 10.

Meanwhile, it will be able to be easily appreciated by those skilled in the art that the present invention is not limited only to the above-described preferred embodiment, but can be implemented by various modifications, changes, substitutions, or additions within the scope without departing from the spirit of the present invention. If the implementation by the modifications, changes, substitutions, or additions belongs to the category of the appended claims, it should be regarded that the technical spirit also pertains to the present invention.

EXPLANATION OF REFERENCE NUMERALS

10: Micom
20: Control signal output unit
30: Conversion unit
40: Water level detection unit
50: Water level signal input unit

The invention claimed is:

1. A water level detection apparatus comprising:
   a micom outputting a first low water level control signal and a second low water level control signal which are square waves having a frequency, and have opposite phases, and receiving water level detection signals for the first low water level control signal and the second low water level control signal, and performing a response operation;
   a control signal output unit receiving the first low water level control signal and the second low water level control signal, and outputs plus DC power and minus DC power having opposite phases for each of the first low water level control signal and the second low water level control signal;
   a conversion unit being applied with the plus DC power and the minus DC power, and outputting a water level monitoring signal which is AC power;
   a water level detection unit supplying the water level monitoring signal to a water level sensor, and outputting a water level detection signal when detecting a low water level of a predetermined reference or less; and
   a water level signal input unit receiving the water level detection signal and outputting the water level detection signal to the micom,
   wherein the control signal output unit includes:
      a first switching unit in which an output terminal is connected to a primary plus terminal of the conversion unit, and which receives the first low water level control signal to be turned on or off,
      a second switching unit in which the output terminal is connected to a primary minus terminal of the conversion unit, and which receives the second low water level control signal to be turned on or off, and is turned on when the first switching unit is turned off, and
      a phase alternate DC voltage supply unit in which one side is connected to the output terminal of the first switching unit and another side is connected to the output terminal of the second switching unit, and in order to alternately supply the plus DC power and the minus DC power to the primary side of the conversion unit, the DC voltage is connected between the one side and the other side, and then connected to a primary intermediate point of the transformer to alternately supply DC powers having different phases by turning on the first switching unit and the second switching unit to the primary intermediate point of the transformer;
   wherein the phase alternate DC voltage supply unit includes:
      a first diode in which an anode is connected to the output terminal of the first switching unit and a cathode is connected to the intermediate point,
      a second diode in which the anode is connected to the output terminal of the second switching unit and the cathode is connected to the intermediate point, and
      a third resistor in which the DC power is applied to one terminal and the other terminal is connected to the cathodes of the first diode and the second diode.

2. The water level detection apparatus of claim 1, wherein the micom outputs the first low water level control signal and the second low water level control signal only for a predetermined time when a water level monitoring event occurs.

3. The water level detection apparatus of claim 1, wherein the micom adjusts frequencies of the first low water level control signal and the second low water level control signal in order to change frequency of the water level monitoring signal.

4. A water level detection method comprising:
- a water level monitoring request process of outputting a first low water level control signal and a second low water level control signal micom which are square waves having a frequency, and have opposite phases;
- a control signal output process of receiving, by a control signal output unit, the first low water level control signal and the second low water level control signal, and outputs plus DC power and minus DC power having opposite phases for each of the first low water level control signal and the second low water level control signal to a conversion unit;
- a water level monitoring signal conversion process of being, by a conversion unit, applied with the plus DC power and the minus DC power, and outputting a water level monitoring signal which is AC power;
- a water level detection process of supplying, by a water level detection unit, the water level monitoring signal to a water level sensor, and outputting a water level detection signal when detecting a low water level of a predetermined reference or less;
- a water level signal input process of receiving, by a water level signal input unit, the water level detection signal and outputting the water level detection signal to the micom; and
- a low water level response operation process of receiving, by the micom, the water level detection signal for the first low water level control signal and the second low water level control signal, and performing a response operation, wherein the control signal output process includes
- a first switching step in which a first switching unit receives the first low water level control signal to be turned on or off,
- a second switching step in which a second switching unit receives the second low water level control signal to be turned on or off, and is turned on when the first switching unit is turned off, and
- a phase alternate DC voltage supply step in which in a phase alternate DC voltage supply unit, in order to alternately supply the plus DC power and the minus DC power to the primary side of the conversion unit, the DC voltage is connected between one side of the phase alternate DC voltage supply unit and another side of the phase alternate DC voltage supply unit, and then connected to a primary intermediate point of the transformer to alternately supply DC powers having different phases by turning on the first switching unit and the second switching unit to the primary intermediate point of the transformer, wherein the phase alternate DC voltage supply unit includes
- a first diode in which an anode is connected to the output terminal of the first switching unit and a cathode is connected to the intermediate point, a second diode in which the anode is connected to the output terminal of the second switching unit and the cathode is connected to the intermediate point, and
- a third resistor in which the DC power is applied to one terminal and the other terminal is connected to the cathodes of the first diode and the second diode.

5. The water level detection method of claim 4, wherein the micom outputs the first low water level control signal and a second low water level control signal only for a predetermined time when a water level monitoring event occurs.

6. The water level detection method of claim 4, wherein the micom adjusts frequencies of the first low water level control signal and the second low water level control signal in order to change frequency of the water level monitoring signal.

* * * * *